US011172119B2

(12) United States Patent
Chen et al.

(10) Patent No.: US 11,172,119 B2
(45) Date of Patent: Nov. 9, 2021

(54) DEVICE WITH A CAMERA AND A SCREEN ENABLING CONTROL OF LIGHT OUTPUT CHARACTERISTICS

(71) Applicant: SIGNIFY HOLDING B.V., Eindhoven (NL)

(72) Inventors: Ya Wen Chen, Shanghai (CN); Sheng Peng, Shanghai (CN); Xiao Dan Tang, Shanghai (CN); Shu Guang Kuai, Shanghai (CN); Kangjun Liu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 569 days.

(21) Appl. No.: 15/309,296

(22) PCT Filed: Apr. 24, 2015

(86) PCT No.: PCT/EP2015/058866
§ 371 (c)(1),
(2) Date: Nov. 7, 2016

(87) PCT Pub. No.: WO2015/169619
PCT Pub. Date: Nov. 12, 2015

(65) Prior Publication Data
US 2017/0078562 A1    Mar. 16, 2017

(30) Foreign Application Priority Data
May 5, 2014    (WO) ................ PCT/CN2014/076818
Jun. 19, 2014    (EP) ...................................... 14173099

(51) Int. Cl.
*H04N 5/228*    (2006.01)
*H04N 5/232*    (2006.01)
(Continued)

(52) U.S. Cl.
CPC ..... *H04N 5/23216* (2013.01); *G06K 9/00255* (2013.01); *G06K 9/00288* (2013.01);
(Continued)

(58) Field of Classification Search
CPC .................................................. H04N 5/23216
(Continued)

(56) References Cited

U.S. PATENT DOCUMENTS

| 6,542,180 | B1 | 4/2003 | Wasserman et al. |
| 2004/0145674 | A1 | 7/2004 | Hoppe et al. |

(Continued)

FOREIGN PATENT DOCUMENTS

| EP | 1986047 A2 | 10/2008 |
| EP | 2515526 A2 | 10/2012 |

(Continued)

OTHER PUBLICATIONS

Lindsay, Clifford, "Programmable Image-Based Light Capture for Previsualization," A Dissertation Submitted to the Faculty of the Worcester Polytechnic Institute Jan. 2013 (259 Pages).

*Primary Examiner* — Usman A Khan

(57) ABSTRACT

A device has a camera and a screen for displaying an image captured by the camera. A user specifies desired modification to an image displayed on the screen to produce a desired modified image. This may for example make the user look more attractive. Required light output characteristics of a lighting device are then derived so that subsequent captured images using the altered lighting are closer to the desired modified image.

15 Claims, 4 Drawing Sheets

(51) Int. Cl.
  *G06K 9/00* (2006.01)
  *H04N 5/225* (2006.01)
  *H04N 5/235* (2006.01)

(52) U.S. Cl.
  CPC ......... *H04N 5/2256* (2013.01); *H04N 5/2351* (2013.01); *H04N 5/2354* (2013.01); *H04N 5/23218* (2018.08); *H04N 5/23219* (2013.01); *H04N 5/23222* (2013.01); *H04N 5/23296* (2013.01); *H04N 5/232935* (2018.08)

(58) Field of Classification Search
  USPC ...................................................... 348/222.1
  See application file for complete search history.

(56) References Cited

U.S. PATENT DOCUMENTS

| | | | |
|---|---|---|---|
| 2004/0233296 A1* | 11/2004 | Sugimoto | G06K 9/00228 348/222.1 |
| 2006/0269270 A1 | 11/2006 | Yoda et al. | |
| 2007/0140555 A1 | 6/2007 | Iguchi | |
| 2007/0291334 A1 | 12/2007 | Nakanishi | |
| 2008/0258590 A1 | 10/2008 | Van De Sluis et al. | |
| 2008/0266412 A1* | 10/2008 | Park | G03B 17/20 348/222.1 |
| 2010/0165178 A1* | 7/2010 | Chou | G03B 13/32 348/371 |
| 2010/0244708 A1 | 9/2010 | Cheung et al. | |
| 2012/0024308 A1 | 2/2012 | Giron et al. | |
| 2012/0300011 A1 | 11/2012 | Moletti et al. | |
| 2013/0088154 A1 | 4/2013 | Van Hoof et al. | |
| 2013/0120330 A1 | 5/2013 | Kang et al. | |
| 2013/0120636 A1 | 5/2013 | Baer | |
| 2013/0162862 A1 | 6/2013 | Zhao et al. | |
| 2013/0193853 A1* | 8/2013 | Gouji | H05B 37/02 315/130 |
| 2013/0214698 A1 | 8/2013 | Aliakseyeu et al. | |

FOREIGN PATENT DOCUMENTS

| | | |
|---|---|---|
| WO | 2007105745 A1 | 9/2007 |
| WO | 2011124933 A1 | 10/2011 |

* cited by examiner

DEVICE WITH A CAMERA AND A SCREEN ENABLING CONTROL OF LIGHT OUTPUT CHARACTERISTICS

CROSS-REFERENCE TO PRIOR APPLICATIONS

This application is the U.S. National Phase application under 35 U.S.C. § 371 of International Application No. PCT/EP2015/058866, filed on Apr. 24, 2015, which claims the benefit of Chinese Patent Application No. PCT/CN2014/076818, filed on May 5, 2014 and European Patent Application No. 14173099.4, filed on Jun. 19, 2014. These applications are hereby incorporated by reference herein.

FIELD OF THE INVENTION

This invention relates to devices with a camera and a screen.

BACKGROUND OF THE INVENTION

It is increasingly common for people to take photographs of themselves and to share these with friends using media sharing platforms. Before sharing photos, some users will often process the photos using applications such as Photoshop to make themselves look better. This can for example involve adding certain effects like whitening, warm colouring etc. By improving photos in this way, people feel better about themselves and may be more socially active.

This processing of photos is time consuming and it is not possible for real time sharing of photos or video. For example, processing cannot be carried out in real time while carrying out a video chat or video conference.

There is therefore a need to be able to enhance images in a way which simplifies or avoids the need for image processing and/or which can be carried out in real time.

SUMMARY OF THE INVENTION

The invention is defined by the claims.

According to an example embodiment of the invention, there is provided a device comprising:
a camera;
a screen for displaying an image captured by the camera;
a user input interface; and
a processor, wherein the processor is adapted to:
receive a user input representing a desired modification to an image displayed on the screen showing a scene; and
derive required light output characteristics of a lighting device to change the illumination to the scene such that subsequent captured images reflect the desired modification.

This device enables a user to specify a desired image appearance (for example in terms of parameters which can be influenced by lighting conditions, such as colour or luminance), and the device then calculates a light output to illuminate the scene so that subsequent images have the desired appearance—even without needing any image processing. The user may for example select an image modification which gives the most attractive image (for example in terms of skin tone, appearance of wrinkles on the face etc.), and the subsequent images will then tend to give those desired image properties. In this way, by altering lighting conditions, the need for image editing is avoided. This is of particular interest for live sharing of images, such as sharing of photographs or video conferencing applications using a portable device.

The user input representing the desired modification may be various, for example, as mentioned above and below, 1) in terms of parameters which can be influenced by lighting conditions such as colour or luminance, 2) select a desired one from a set of alternative modified images, 3) describe the desired image effect orally or in text, like "I want the light make me look more gentle", "I would like an romantic atmosphere" and "Please eliminate the wrinkles on my face" etc.

The processor could produce a desired modified image based on the user input (and optionally display the desired modified image on the screen) and derive the required light output characteristics of the lighting device to change the illumination to the scene based on difference between the captured image and the desired modified image such that subsequent captured images are closer to the desired modified image.

However the step of producing the desired modified image is not an essential step for the processor. The processor could simply derive the required light output characteristics of the lighting device directly based on the user input. For example, the processor has a prestored table or list holding two related pieces of information, the image effect and the associated light output characteristics.

The invention thus provides an intelligent lighting system, which can automatically replicate a user-specified effect of a processed image, and then adjust the ambient lighting to reproduce the effects in real time. The modification may for example relate to image properties such as hue, saturation and luminance.

The require light output characteristics, to give rise to the desired modified image, can be converted to LED drive signals, such as LED drive currents.

The lighting device to provide the light output to illuminate the scene may be fixed lighting forming part of the area in which the device is being used. In this case, the device may communicate with the fixed lighting to implement the desired change in lighting conditions.

The device may further comprise the lighting device. In this case, the device itself provides the required lighting. It can thus be used in any environment, and the device does not need to control external lighting units.

The processor may be adapted to receive a user input identifying a selected one of a set of modified images.

In this way, the user can make a simple selection of a preferred image from a set, and the lighting conditions are then modified so that future images captured by the camera approximate to, or may even be the same as that desired image appearance.

The processor may be adapted to derive a difference between a metric representing the selected modified image and a metric representing the original image, and derive the required light output from the difference. This metric may for example be the average RGB values of the pixels which form selected face areas of the modified image.

By processing a difference signal, the required lighting conditions can be derived with simple processing. The metric is a measure which provides an indication of lighting conditions. It may for example be derived from RGB pixel values of the original image and the desired modified image.

For example a number of pixels (Np) may first be determined that will be sampled from the selected face area of the modified image. The RGB values from these pixels will be used in order to derive the required lighting parameters. The lighting parameters derived will depend on the size Np of the set of pixels which are analysed. For example there will be an offset between the RGB values of each pixel of the modified image and the original image, The average of the Red, Green and Blue offsets can then be output to the lighting system and adjusting those colour components of the lighting system to deliver lighting which gives rise to the desired lighting effects.

The device may comprise a portable device, such as a mobile phone or tablet, and the lighting device may then comprise a camera flash of the portable device. This provides a fully integrated and portable solution so that real time image sharing can be carried out at any location. The subsequent captured images can be static or they can form a video sequence. These images may for example be photographs to be shared on a media sharing platform or video images used for a live video link or conference between two or more participants.

The captured image and the subsequent captured images preferably include the face of a user. A user may be particularly sensitive to creating a desired look for their face.

In this case, the processor can be adapted to:

perform a face recognition function;

derive a metric representing the pixel properties for the face area of the image and for the face area of the desired modified image; and derive the light output characteristics from a difference between the metrics.

In this way, the lighting is tailored to create a desired modification to the image of the user's face.

The invention also provides a method of controlling lighting using a device which has a camera and a screen, the method comprising:

capturing an image of a scene using the camera of the device;

displaying the image on the screen of the device;

receiving a user input representing a desired modification to the displayed image;

deriving required light output characteristics of a lighting device to change the illumination to the scene such that subsequent captured images reflect the desired modification; and controlling the lighting device to output the required light output characteristics.

The invention also provides a computer program product downloadable from a communication network and/or stored on a computer-readable and/or microprocessor-executable medium, characterized in that it comprises program code instructions for implementing a method for controlling lighting using a device which has a camera and a screen as defined above when the program is run on a computer.

The invention also provides a medium is provided for storing and comprising the computer program product as defined above. The medium can be anything ranging from a volatile memory to a non-volatile memory, such as RAM, PROM, EPROM, a memory stick, or flash drive, or another non-volatile storage such as a hard disk or an optical medium, etc.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a device having a camera and a screen for displaying an image captured by the camera. A user specifies a desired modification to an image displayed on the screen to produce a desired modified image. This may for example make the user look more attractive. A lighting device is then controlled so that subsequent captured images using the newly altered lighting are closer to the desired modified image.

The lighting can be provided by the device itself or it can be separate to the device.

Figure 1:
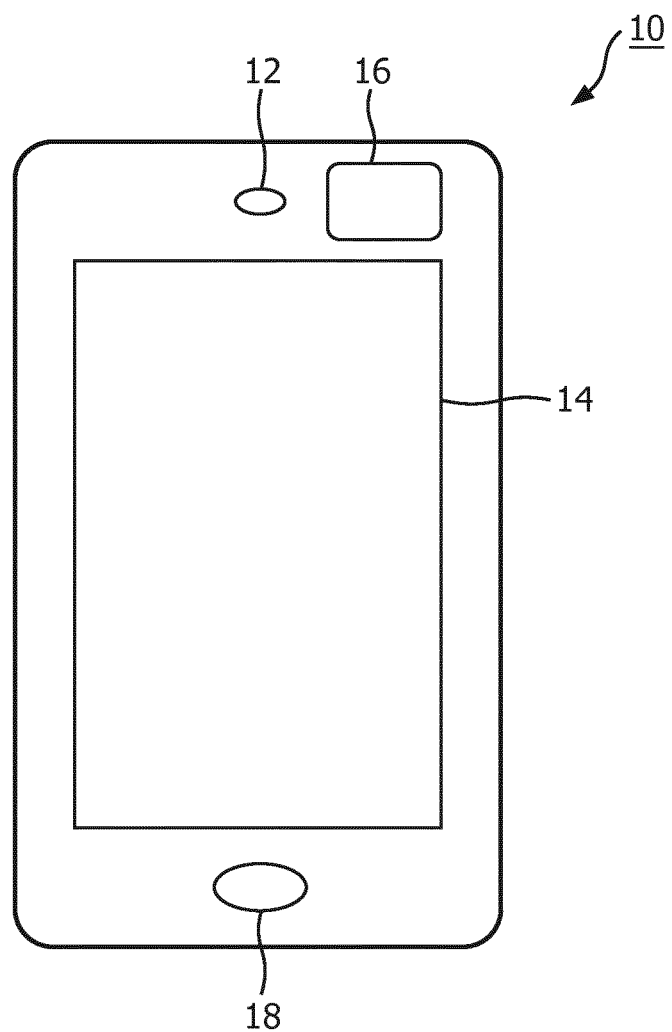
FIG. 1 shows a device according to an embodiment.

FIG. 1 shows a device according to an embodiment in which the lighting is provided by the device itself, and in which the device is a portable device such as a tablet or mobile phone.

The portable device 10 comprises a camera 12, the lens of which is shown, and a screen 14 for displaying an image captured by the camera. A lighting device in the form of a camera flash 16 is provided and in this example it doubles as a general constant illumination source. The device has a user input interface which can comprise the screen, buttons (one of which is shown as 18) or a combination of these.

The device has a processor which receives a user input representing a desired modification to an image displayed on the screen 14 showing a scene, to produce a desired modified image. Light output characteristics of the lighting device 16 are derived, to change the illumination to the scene such that subsequent captured images are closer to the desired modified image.

Figure 2:
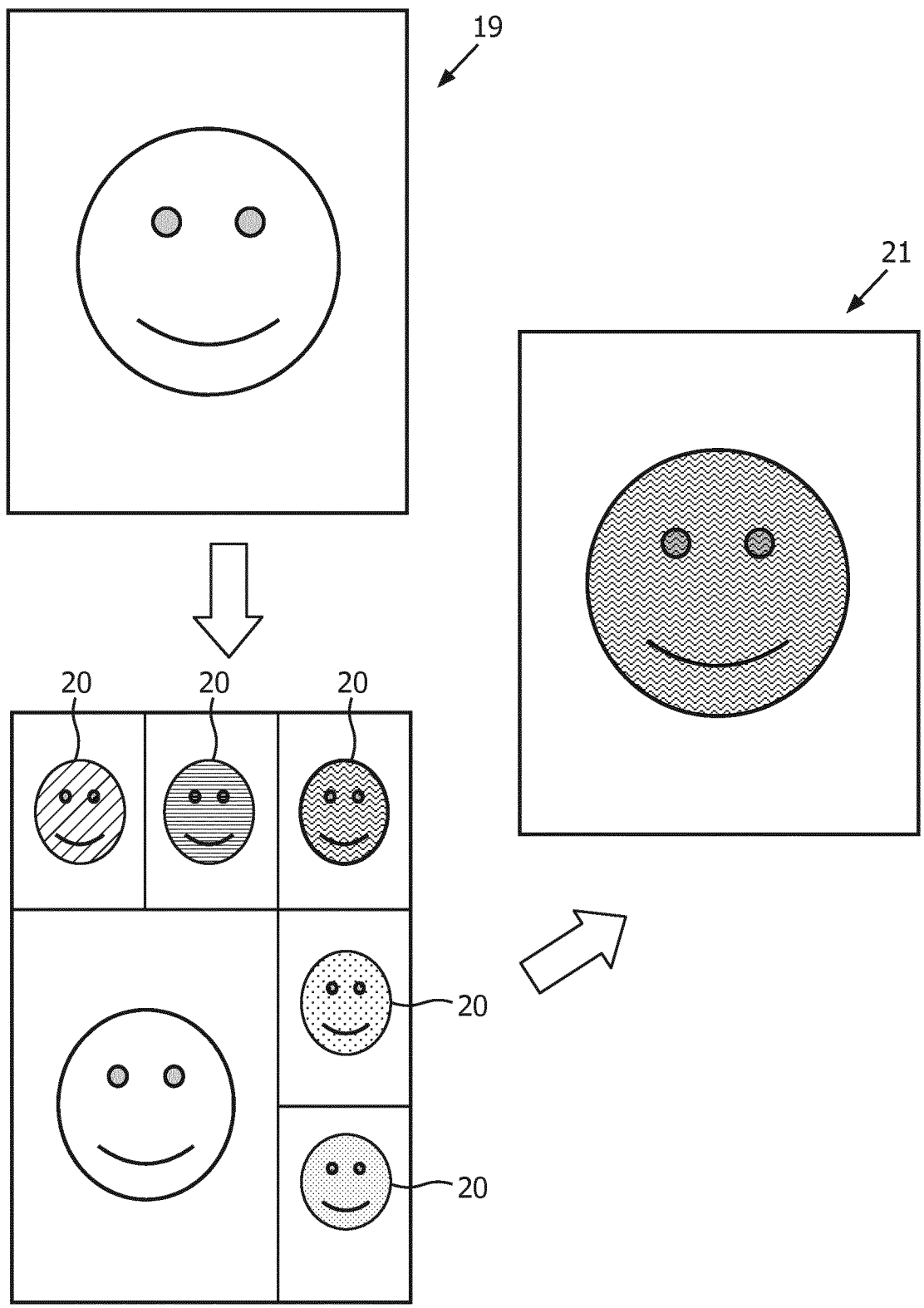
FIG. 2 is used to explain a first operating method.

FIG. 2 is used to explain a first operating method. The top part shows an original image 19 taken by the user and displayed on the screen. To enable the user to select a modified version, a set of alternative modified images 20 is presented as shown in the lower part.

These modified images have parameters changed which are influenced by lighting conditions, such as colour or luminance. Such image modifications are well known in image processing applications, for making an image appear warmer, or cooler, or brighter or darker, or with less saturated colours or with more saturated colours etc.

In this case, the set of modified images correspond to changes in visual effect which can be obtained by controlling the ambient light. For example, the image modifications can correspond to changes in appearance which would result from different colour ambient lighting and/or different intensity ambient lighting.

This means that it is possible to replicate the desired image modification by changing the ambient lighting, so that image processing of subsequent images is not required in order to approximate the desired image modification.

The user selects the desired one of the modified images 20. The device then calculates a metric which relates to the pixel properties of an image. In one example, the metric is the average RGB values (i.e. the average R value, the average G value and the average B value) of the pixels from a face area of the image. This face area can be identified automatically, or it can be defined by the user, By comparing how this metric has changed between the original image 19 and the image 20 selected by the user, the metric is used to determine the light output which is then used to illuminate the scene so that subsequent images have the desired appearance—even without needing any image processing. The light output is controlled by selecting suitable current drive values for an LED light source for example.

The changes in R,G,B values will be readily available from the image transformation functions used to generate the multiple options 20 for the user.

For each type of LED lamp or luminaire, a look-up table can be used which stores the relationship between the drive current values and light output characteristics. These light output characteristics can be presented as:

RGB values;
hue, saturation and brightness values; or
color coordinates.

The look-up table can be stored in the lighting controllers. This relationship between the drive current values and light output characteristics can for example be measured before running of the lighting system.

This relationship could be used as a starting point for adjusting the lighting device. However, as will be explained below, there may nevertheless be several subsequent iterations, after which the captured image will have an acceptably small difference to the desired modified image.

The flash 16 is then controlled to deliver the required ambient lighting. Image 21 is an image taken with the altered lighting conditions.

The user may for example select an image modification which gives the most attractive image (for example in terms of skin tone, appearance of wrinkles on the face etc.), and the subsequent images will then tend to give those desired image properties without requiring image processing.

Figure 3:
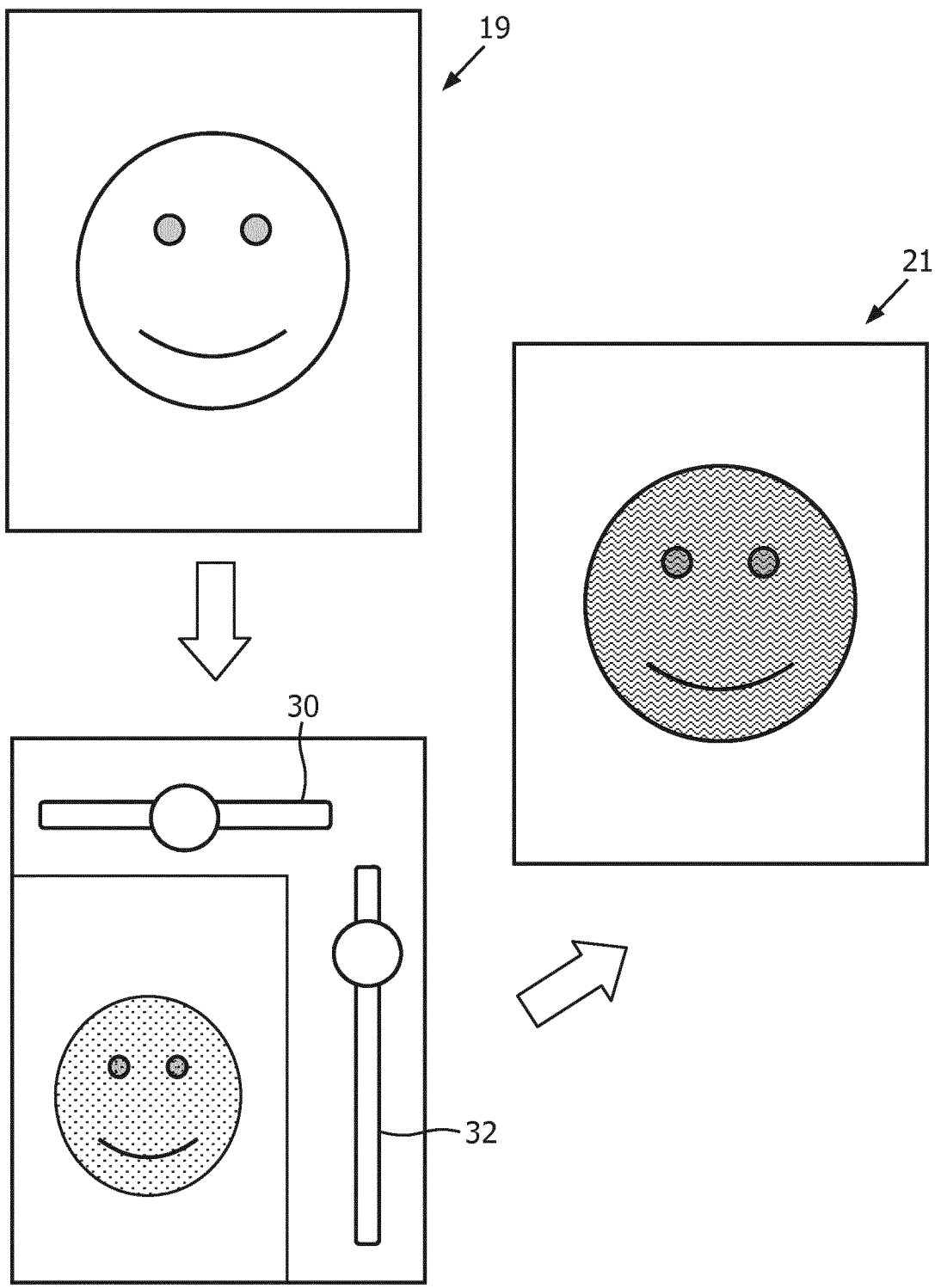
FIG. 3 is used to explain a second operating method.

FIG. 3 shows an alternative method. In this case, the device presents the user with control inputs, in this case shown as sliders 30,32 which enable the image properties to be adjusted instead of presenting pre-defined modified images. One slider can correspond to a colour of the lighting to be applied and the other can correspond to the intensity.

The lighting unit may for example have controllable RGB components and overall luminance. There is a direct mapping between RGB and the hue and saturation of a colour, so that the lighting control may by equivalence comprise control of these parameters.

There may for example be three controls—one for hue, one for saturation and one for luminance. Alternatively, there may be three controls—one for red, one for green and one for blue. There may be all six controls, so the user can choose which to adjust, and the mapping between RGB and hue/luminance/saturation will be maintained by the controller.

Figure 4:
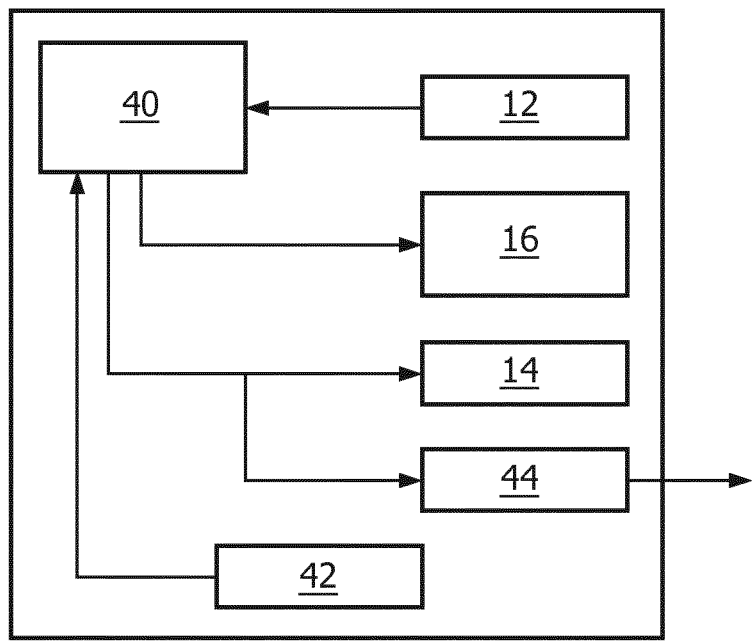
FIG. 4 shows a first example of device in more detail.

FIG. 4 shows a first example of device in more detail.

The device comprises the camera 12, display 14 and light source 16 as explained above. A controller 40 implements the control method explained above, and thus controls the output image from the display 14 as well as receiving user input from a user input interface 42, which may include the display itself having a touch screen input.

A transmitter 44 outputs the images after control of the lighting, for example over a mobile telephony network. The images are for example posted to media sharing platforms, or they may be used for a live video communication.

Figure 5:
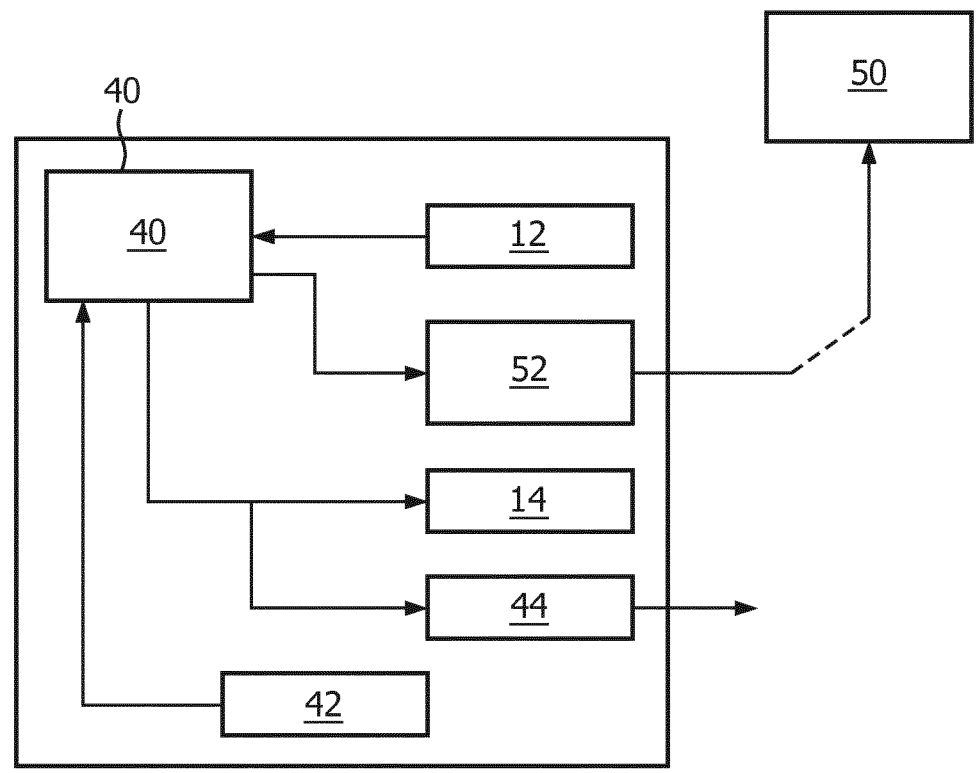
FIG. 5 shows a second example of device in more detail.

FIG. 5 shows a second example of device in more detail.

The device again comprises the camera 12, display 14, controller 40 and input interface 42.

In this example, the lighting system 50 is not part of the device. The device has a short range transmitter 52 for communicating with the light source 50 to alter its settings. This may for example be a WiFi, Bluetooth or Zigbee interface, or any other short range standard. The mobile telephony transmitter 44 is also provided.

In this case, the lighting system 50 which provides light to illuminate the scene may be fixed lighting forming part of the area in which the device is being used. In this case, the device communicates with the fixed lighting to implement the desired change in lighting conditions.

The device and method can be used for uploading photos in real time, or for on-line video chatting using a portable device. However, it is not only of interest for real time applications, and can be used as a way to provide enhanced images in a natural way. In particular, the images are direct images without manipulation—only the lighting conditions have been changed. Thus, the device and method can be used simply to improve the quality of images by controlling the lighting, such as fixed room lighting, using the camera device.

To derive the required light output, the RGB values of the captured image and of the modified image may be analysed pixel by pixel.

A metric can then be obtained, for example the average red, green and blue values for the entire image. The metric may thus comprise a set of values (i.e. a vector). One metric then represents the original image and one represents the selected modified image. The required light output can then be derived from the difference between these metrics.

It is noted that the difference could be measured in other form of parameters other than in a metric. For example, it could be difference between averaged value of R,G,B or H,S,L values of all pixels of the original image and selected modified image. Alternatively, it may be difference between R,G,B or H,S,L values of a single pixel of the original image and selected modified image. Preferably, the single pixel locates in the user's face in the picture.

By way of example, the controller can implement a face recognition algorithm, to identify regions of an image which contain a face (or multiple faces). The lighting conditions are typically selected to improve the appearance of the face, so the lighting control can be based on analysis of the face regions.

In this case, the average red, green and blue pixel values the face area(s) will then be determined. The difference in red, green and blue values is then obtained between the original captured image and the chosen modified image.

The aim of the lighting control is to bring these differences to zero.

When the face area is used, the face recognition can first involve determining the number of pixels (Np) that will be sampled from the selected face area and then the RGB values from these pixels will be calculated in order to offset the lighting parameters. The average of the offset between the average colour value in the original image and in the selected modified image is used as the control signal for outputting to the lighting system and adjusting the lighting to deliver the expected lighting effects.

The lighting unit can comprise any lighting arrangement with controllable colour point. An example is an LED lighting arrangement with red, green and blue LEDs. At least three colors LEDs need to be selected, and the triangle determined by these three colors is the color gamut. The more LEDs that are selected, the bigger color gamut is.

Red, green and blue LEDs are three typical colors chosen. Colours may be generated using the combination of Blue LEDs and suitable phosphor layer. In this case the color gamut is the determined by the Blue LED colour point and the phosphor characteristics. By above mentioned methods, controllable color point is determined.

The color can be defined with RGB coordinates, or HSL (Hue, Saturation, Lightness) or HSV (Hue, Saturation, Value) which can be transformed between each other by available conversion formula. The control signals to the lighting unit then comprise PWM (pulse width modulation) signals for the different LED colours to control the colours independently.

If the light source is external to the device, as in the example of FIG. 5, it has a communications module (e.g. Zigbee) which can receive a signal indicating the lighting parameters sent from the device, and de-code the signal into the required PWM signals for lighting control.

The required light output to achieve the desired change in the captured image will depend on the position of the light source relative to the user, as well as the nature and orientation of the light source. When the light source is the flash of a portable device, its properties are known. The likely position with respect to the user is also known. Thus, it is possible to model in advance the way the light source changes the illumination of the user. In this way, there can be a simple mapping between the desired change in lighting conditions (i.e. the RGB difference) and the required light control signals.

In a most simple implementation, the difference in the average red content of the part of the image of interest (i.e. the whole image or else the face parts) is simply scaled to derive a desired red content of the illumination source. Similarly, the difference in the average blue content is scaled (by the same or a different amount) to derive a desired blue content of the illumination source. Similarly, the difference in the average green content is scaled (by the same or a different amount) to derive a desired green content of the illumination source.

Instead of RGB values, hue, luminance and saturation values of the two images can be processed to derive lighting control signals. As mentioned above, there is a direct mapping between different colour coordinate systems, so that the required processing is essentially the same. Essentially, a difference (or set of differences) in the light properties between the original image and the desired modified image is identified. This difference is then used to control the lighting. The RGB content of the images may be analysed, but the lighting can be controlled using HSL or HSV control commands. Similarly, the HSL or HSV content of the images may be analysed and the lighting can be controlled by other parameters such as RGB values.

Of course, the desired light output may be derived by a more complicated algorithm than the simple averaging of R, G and B values to derive the required R,G and B components of the lighting.

For example, the ratios between colour components may be used instead of the absolute pixel values. Furthermore, maximum and/or minimum colour component values may be discarded from the processing used to derive the lighting conditions. Thus, the metric may be more complicated than a simple average of the individual pixel characteristics.

For a light source which is not part of the device, the lighting effects will not be known in advance. For example the angle between the light output and the user will not be known, and the distance of the light source to the user will not be known. In this case, a feedback approach may be employed. For example, after a modified image is chosen, the lighting conditions can be changed based on a set of assumptions and a new image captured. The selection of a modified image can be repeated (one or more times) so that the lighting converges to suitable light output conditions with the user providing feedback by making repeated selections of modified images.

The system can learn from each iteration. For example, if the first adjustment to the light output does not achieve the desired modification to the image, the set of assumptions can be changed so that the next iteration may give better results. This keeps the required number of iterations to a minimum.

The feedback may be automatic instead of manual. In this case, the lighting can be controlled to change a number of times without user input, but with the system aiming to minimise the difference between a resulting image and the modified image as initially chosen by the user.

An example of a possible automatic iteration process will now be described. If the target image properties are (Rt, Gt, Bt), this target information is sent as inputs to the luminaire, and the the lighting control signals are derived. As explained above, these lighting control signals are derived from differences between the target image properties and the actual image properties, which are then converted to corresponding drive current values of the R,G, B LEDs obtained from the stored look up table. This look up table is used to control the luminaires.

The realized RGB lighting values which actually result on the face area after the lighting modification will give realized image properties, for example values (Rr,Gr,Br). Due to skin reflectance and environment reflectance, there is likely to be a difference between the target and realized colour values.

As mentioned above, the aim of the lighting control method is to bring these differences to zero or to an acceptable error. The amount of acceptable error can be selected by the user, so that if the end user does not desire very great accuracy, a larger error can be tolerated. The number of iterations will depend on the desired accuracy.

If the target image properties are set as (Rt, Gt, Bt) adjusting values (Ra, Ga, Ba) may be be considered as new target value, and they are set as:

$Ra=2Rt-Rr,$ $Ga=2Gt-Gr,$ $Ba=2Bt-Br.$

At each iteration, the values Ra,Ga,Ba are processed to derive the lighting settings. The processes will converge to the point where Rt=Rr, Gt=Gr and Bt=Br. Thus, the error (between the desired modified image properties and the realized image properties) will be brought closer to zero with each iteration. The iterations will stop when the error has fallen below a target. Of course, there may also be a maximum number of iterations. For example, there may be cases where the lighting unit is unable to provide the desired image modification as a result of the dominance of uncontrolled ambient lighting.

In the example above having an integrated light source, it comprises the camera flash. However, separate light sources may be provided, one of which is optimised for a flash function (i.e. a high intensity short duration burst) and the other is optimised for lower intensity continuous lighting with colour control.

The examples above show a portable device, but the invention is not limited to this. For example, the device may be part of a photography system, for example a booth used for on-line chatting. The lighting within the booth can then be controlled by the user selecting the lighting that best enhances their appearance.

The example above makes use of face recognition (by which is meant the recognition of which part of an image is a face, not whose face it is). An alternative is to use a filter for skin tones, so that portions of an image which include skin colour tones can be identified, without needing face recognition software.

The user modified image may be considered to be a reference image which the lighting system is trying to emulate by modifying the lighting conditions. The lighting conditions are modified until the reference image and the captured image differ by an amount below a threshold. The image data being compared can comprise RGB information, CMYK information, hue and saturation information or colour temperature information (or combinations of these).

The device makes use of a controller for implementing the algorithm for controlling the lighting. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A device comprising:
   a camera;
   a screen for displaying a first image captured by the camera;
   a user input interface; and
   a processor, wherein the processor is adapted to:
     communicate with at least one lighting device illuminating a scene;
     receive a user input representing a desired modification to the image displayed on the screen showing the scene; and
     derive required light output characteristics of the at least one lighting device to change the illumination of the scene such that subsequent captured images reflect the desired modification, wherein the processor is configured to derive said light output characteristics by determining a difference between first image characteristics of said first image and second image characteristics of a desired modified image including said desired modification,
   wherein said screen is configured to display said desired modified image and wherein the processor is configured to derive said light output characteristics by determining the difference between the first image characteristics and the second image characteristics in response to receiving a selection of said displayed desired modified image in said user input, and
   wherein the difference between the first image characteristics and the second image characteristics is a first difference, and wherein the processor is configured to derive said light output characteristics based on the first difference so that a second difference between third image characteristics, of a third image of the scene having the light output characteristics captured by the camera, and said second image characteristics is less than said first difference.

2. A device as claimed in claim 1, wherein the processor is further configured to:
   use the user input to produce the desired modified image; and
   derive the required light output characteristics based on the difference such that the subsequent captured images are closer to the desired modified image.

3. A device as claimed in claim 1, wherein the modification relates to image properties comprising hue, saturation and luminance.

4. A device as claimed in claim 1, wherein the desired modified image is a selected from a set of modified images.

5. A device as claimed in claim 4, wherein the processor is adapted to derive a difference between a metric representing the selected desired modified image and a metric representing the first image, and derive the required light output characteristics from the difference between the metrics.

6. A device as claimed in claim 1, wherein the first image and the subsequent captured images include the face of a user and the processor is further adapted to:
   perform a face recognition function;
   derive a metric representing pixel properties for a face area of the first image and a metric representing pixel properties for a face area of the desired modified image; and
   derive the light output characteristics from a difference between the metrics.

7. A device as claimed in claim 1, further comprising a short range transmitter operable to communicate with a remote lighting system comprising the at least one lighting device.

8. A device as claimed in claim 1, wherein said difference between the first and second image characteristics includes a difference of at least one of color, hue, saturation, lightness or brightness value determined from said first image and from said desired modified image.

9. A method of controlling lighting using a control device, the control device comprising a camera and a screen, the method comprising:
   capturing a first image of a scene using the camera of the device, wherein at least one lighting device illuminates the scene;
   displaying the image on the screen of the control device;
   displaying a desired modified image;
   receiving a user input representing a desired modification to the displayed first image to produce the desired modified image;
   deriving required light output characteristics of the at least one lighting device to change the illumination of the scene such that subsequent captured images are closer to the desired modified image,
     wherein the deriving the required light output characteristics comprises determining a difference between first image characteristics of said first image and second image characteristics of the desired modified image, wherein the determining the difference between the first image characteristics and the second image characteristics is performed in response to a selection of said displayed modified desired image in said user input, wherein the difference between the first image characteristics and the second image characteristics is a first difference, and wherein said deriving the required light output characteristics is performed such that a second difference between third image characteristics, of a third image of the scene having the light output characteristics captured by the camera, and said second image characteristics, is less than said first difference; and transmitting a signal in order to implement said light output characteristics by the at least one lighting device.

10. A method as claimed in claim 9, wherein said displaying the desired modified image on the screen comprises displaying a set of modified images, and said receiving the user input comprises receiving selection of the desired modified from he set of modified images.

11. A method as claimed in claim 9, wherein the deriving the required light output characteristics comprises deriving a difference between a metric representing the selected desired modified image and a metric representing the first image, and deriving the required light output characteristics from the difference between the metrics.

12. A method as claimed in claim 9, comprising:

performing a face recognition function;

deriving a metric representing pixel properties for a face area of the first image and a metric representing pixel properties for a face area of the desired modified image; and deriving the light output characteristics from a difference between the metrics.

13. A storage medium comprising a program code of instructions that causes a processor to implement the method of claim 9.

14. A method as claimed in claim 9, wherein the control device further comprises a short range transmitter and wherein the transmitting comprises transmitting said signal to a remote lighting system comprising the at least one lighting device in order to implement said light output characteristics by the at least one lighting device.

15. A method as claimed in claim 9, wherein said difference between the first and second image characteristics includes a difference of at least one of color, hue, saturation, lightness or brightness value determined from said first image and from said desired modified image.

* * * * *